March 17, 1959  A. J. BRUTOSKY  2,878,080
SHANK CLAMP FOR CULTIVATOR SHOVEL
Filed Sept. 23, 1957
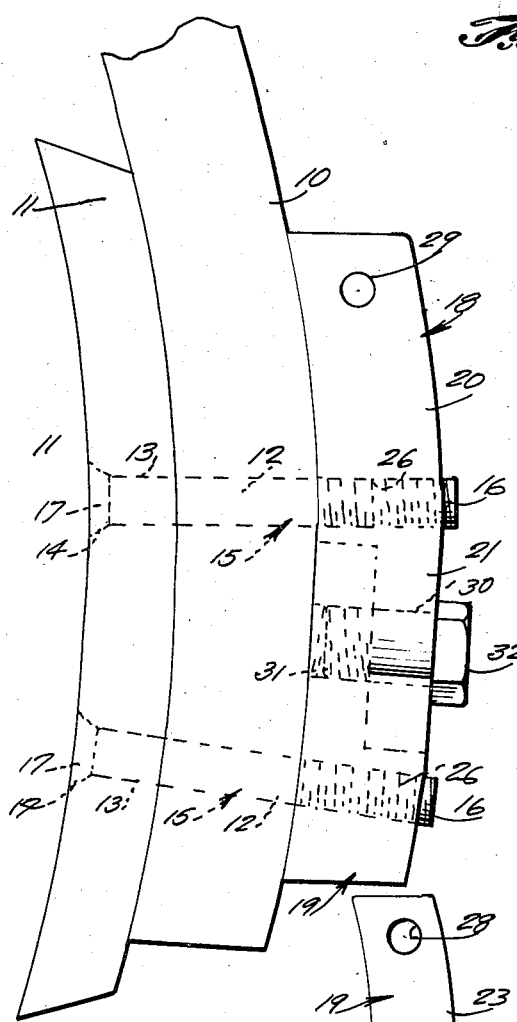
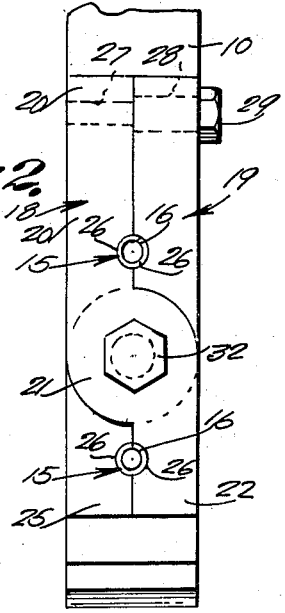
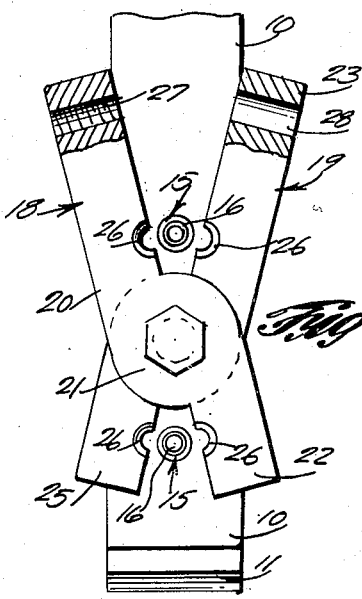
INVENTOR
Andrew J. Brutosky
BY Victor J. Evans & Co.
ATTORNEYS

United States Patent Office 2,878,080
Patented Mar. 17, 1959

2,878,080

SHANK CLAMP FOR CULTIVATOR SHOVEL

Andrew J. Brutosky, Choteau, Mont.

Application September 23, 1957, Serial No. 685,577

1 Claim. (Cl. 306—1.6)

This invention relates to an agricultural implement, and more particularly to a clamp for attaching chisels or shovels to plow shanks.

The object of the invention is to provide a clamp which provides a means whereby a plow chisel or shovel can be readily attached to or detached from a plow shank.

Another object of the invention is to provide a clamp which is adapted to be used for securely attaching a plow chisel or shovel to a shank so that when it is desired, to remove or replace the shovel or chisel, the clamp can be readily disengaged whereby the shovel can be readily removed or replaced.

A further object of the invention is to provide a shank clamp which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a fragmentary elevational view illustrating the clamp of the present invention.

Figure 2 is a view taken at right angles to the view shown in Figure 1.

Figure 3 is a view similar to Figure 2, but showing the jaws in open position.

Figure 4 is an elevational view illustrating one of the jaws.

Referring in detail to the drawings, the numeral 10 indicates a portion of a plow shank which may form part of an agricultural implement, and arranged contiguous to the lower end of the shank 10 is a shovel or chisel which is indicated by the numeral 11. The shank 10 is provided with openings 12 which register with openings 13 in the shovel 11, and the shovel 11 is further provided with countersunk recesses 14. The numeral 15 indicates bolts which extend through the registering openings 12 and 13, and the bolts 15 include threaded end portions 16 for a purpose to be later described. Each bolt 15 further includes an enlarged head 17 which is seated in the countersunk recess 14.

There is further provided a pair of jaws 18 and 19 which are pivotally connected together, and the jaw 18 includes a first portion 20, an intermediate second portion 21, and a third portion 22. The jaw 19 includes a first portion 23, an intermediate second portion 24, and a third portion 25.

As shown in Figure 3 for example, the portions 20 and 23 of the jaws 18 and 19 are provided with semi-circular cutouts 26 which are threaded, so that when the parts are in the position shown in Figure 2, the cutouts 26 engage the threaded portions 16 of the bolts 15 whereby a clamping arrangement is provided. The portions 22 and 25 of the jaws are also provided with similar semi-circular threaded cutouts 26 which are adapted to engage the lower threaded portion 16 of the lower bolt 15 when the jaws are in closed position as shown in Figure 2.

There is provided in the portion 20 of the jaw 18, a threaded hole 27 which is adapted to register with a smooth hole 28 when the jaws are closed, and a headed bolt 29 is adapted to extend through the hole 28 and threadedly engage the hole 27 so as to maintain the jaws 18 and 19 in their closed position.

The portion 21 of the jaw 18 is provided with a smooth bore or opening 30, which registers with a threaded bore or opening 31 in the portion 24, and a pivot bolt 32 has a portion thereof extending through the bore 30 and threadedly engaging the bore 31 so that the bolt 32 provides a pivotal connection between the jaws 18 and 19.

From the foregoing, it is apparent that there has been provided a clamping arrangement which is especially suitable for use in connecting a member such as the shovel 11 to a shank 10, and wherein the shank 10 may form part of an agricultural implement. The shovel 11 is adapted to be used for cultivating the soil or working the soil in the usual manner, and the clamping mechanism of the present invention provides a means whereby the shovel 11 can be securely clamped to the shank 10, and wherein the shovel 11 can be readily removed from the shank when desired. When the parts are in clamping position, they are arranged as shown in Figure 2, and in Figure 2 it will be seen that the bolt 29 has a portion thereof extending through the opening 28 in the jaw 19, and the bolt 29 also has a portion thereof which threadedly engages the threaded opening 27 in the jaw 18 and this arrangement serves to maintain the pair of jaws 18 and 19 in their closed or side-by-side position. When the jaws 18 and 19 are in the closed position shown in Figure 2, the semi-circular threaded cutouts 26 engage opposite sides of the threaded portions 16 of the bolts 15 so that the bolts 15 will be securely clamped between the jaws 18 and 19 whereby the bolts 15 cannot accidentally work loose. Thus, the shovel 11 will remain firmly secured to the shank 10. When the shovel 11 is to be removed or replaced, it is only necessary to unscrew the bolt 29 from the threaded opening 27 whereby the jaws 18 and 19 can be pivoted apart from the position shown in Figure 2 to the position shown in Figure 3, and the pivot bolt 32 provides a pivotal mounting between the jaws whereby the jaws can be swung to their open position. It will be seen that with the jaws 18 and 19 in their open position as shown in Figure 3, the threaded cutouts 26 are out of engagement with the portions 16 of the bolts 15 so that these bolts 15 can be readily withdrawn or removed from the openings 12 in the shank 10 so that the shovel 11 can be readily removed as when it is to be repaired or replaced.

Thus, it will be seen that there has been provided a device which is especially suitable for use in fastening chisels or shovels to different types of chisel-type plows. By loosening the bolt 29, the vice grip hold on the bolts 15 will be released and then the jaws can open in the same manner that a pair of pliers open so that the device can easily be slipped off. By tightening the bolt 29, the jaws are fastened securely to the bolts 15 and then by tightening the bolt 32, pressure is applied on the bolts 15 so that the chisel or shovel 11 is pulled tight against the shank 10.

The parts can be made of any suitable material and in different shapes or sizes. Chisels and shovels in use today are fastened to shanks by means of nuts on bolts similar to the bolts 15, and after these parts are used in the ground and in rocky soil, they become rusted and out of shape so that they are very difficult to remove because the countersunk bolts 15 often turn and cannot be held with any wrench. By means of the present invention, these disadvantages or difficulties are overcome.

I claim:

In an agricultural implement, a plow shank, a shovel arranged contiguous to said shank, there being registering openings in said shank and shovel, there being countersunk recesses in said shovel communicating with said openings, first bolts extending through said openings and said bolts having heads seated in said recesses, said bolts including threaded end portions, a pair of jaws arranged on the opposite side of said shank from said shovel and each of said jaws including a first portion, said first portions being each provided with a semi-circular threaded cutout for engagement with the threaded portion of certain of said first bolts, one of said first portions having a threaded hole and the other first portion having a smooth hole adapted to register with said threaded hole when the first portions of said jaws are in side-by-side relation with respect to each other, a headed bolt having a portion extending through said smooth hole and threadedly engaging said threaded hole, each of said jaws further including an intermediate second portion, one of the second portions having a smooth bore and the other second portion having a threaded bore, a headed bolt extended through said smooth bore and threadedly engaging said threaded bore, each of jaws further including a third portion, said third portions being provided with semi-circular threaded cutouts for engagement with the threaded portions of certain of said first bolts.

References Cited in the file of this patent

UNITED STATES PATENTS 1,576,425      Goodnight      Mar. 9, 1926